W. D. BAKER.
FLY TRAP FOR SCREEN DOORS.
APPLICATION FILED AUG. 24, 1910.
998,449.
Patented July 18, 1911.
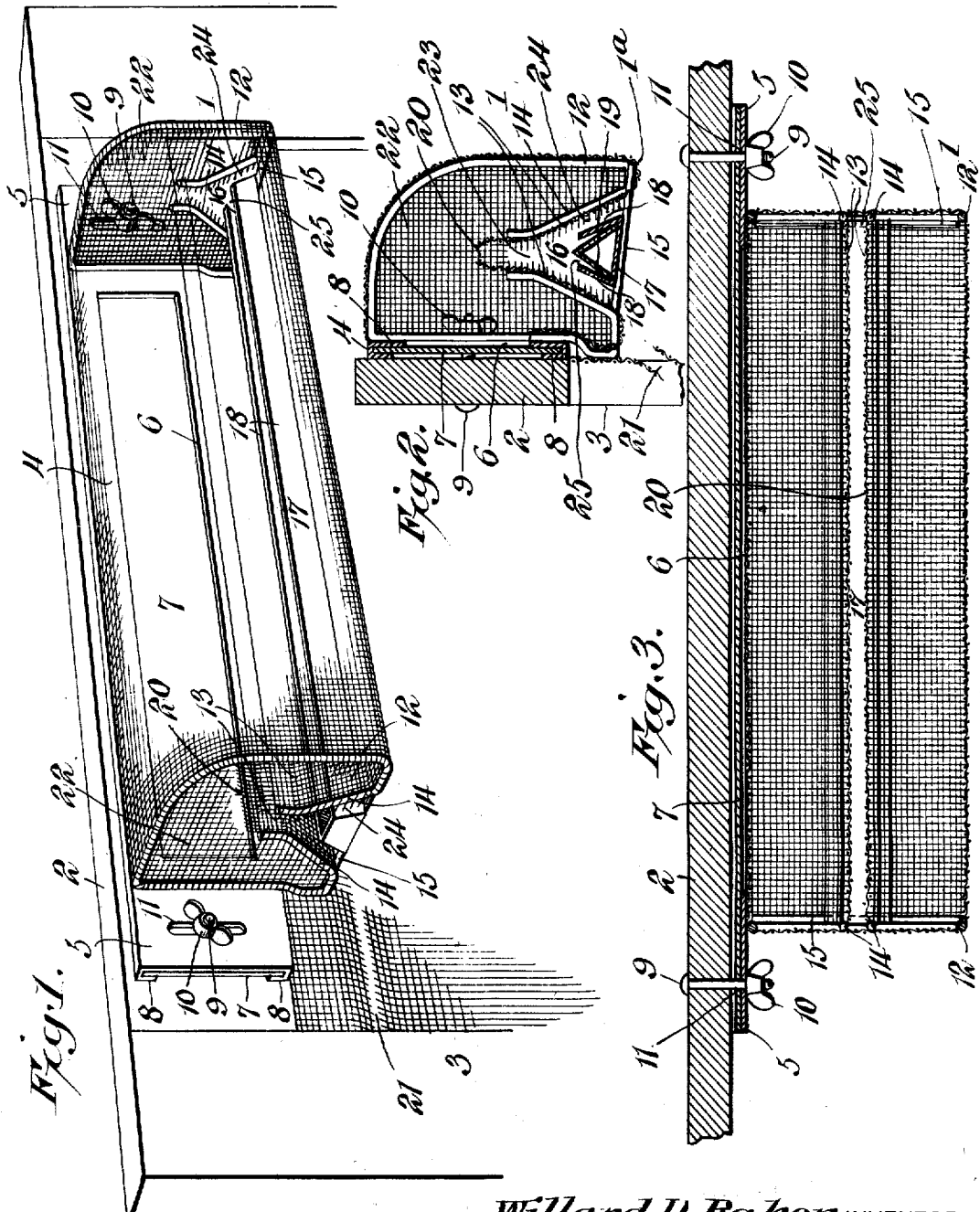
WITNESSES
Willard D. Baker, INVENTOR,
BY
ATTORNEY

UNITED STATES PATENT OFFICE.

WILLARD D. BAKER, OF ROGERS, ARKANSAS, ASSIGNOR TO J. W. ROBINSON.

FLY-TRAP FOR SCREEN-DOORS.

998,449.  Specification of Letters Patent.  Patented July 18, 1911.

Application filed August 24, 1910. Serial No. 578,737.

*To all whom it may concern:*

Be it known that I, WILLARD D. BAKER, a citizen of the United States, residing at Rogers, in the county of Benton and State of Arkansas, have invented a new and useful Fly-Trap for Screen-Doors, of which the following is a specification.

The invention relates to a fly trap for screen doors.

The object of the present invention is to improve the construction of fly traps, and to provide a simple, inexpensive and efficient fly trap, designed to be mounted on a screen door for catching the flies, which accumulate on the latter, and capable of being readily removed for destroying the captured insects and readily replaced when the same have been emptied from the trap.

A further object of the invention is to provide a fly trap of this character, adapted to hold a bait in position for attracting the flies to the entrance of the trap and of retaining the same in place to prevent the bait from being dislodged by the opening and closing of a screen door.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a fly trap, constructed in accordance with this invention and shown applied to the upper portion of a screen door. Fig. 2 is a transverse sectional view of the same. Fig. 3 is a horizontal sectional view.

Like numerals of reference designate corresponding parts in all the figures of the drawing.

In the embodiment of the invention illustrated in the accompanying drawing, the fly trap 1 is mounted upon the top bar or rail 2 of a screen door 3, and it comprises in its construction a sheet metal wall or back 4, and a top, front bottom and end walls of woven wire, or other screen material. The sheet metal wall 4 has extended terminals 5, and is provided intermediate of its ends with a longitudinal slot or opening 6, which is normally covered by a slidable closure 7, mounted in guides or ways 8, formed by bending the upper and lower edges of the rear wall or back 4 to form inwardly extending approximately L-shaped flanges. The trap is secured to the door by means of screws 9 spaced from the trap and having thumb nuts 10, which admit of the ready removal of the trap for destroying the captured insects. The screws 9 are mounted on and project horizontally from the top rail of the door, and they extend through vertical slots 11 of the extended terminals 5 and the end portions of the slide or closure 7, which is retained in place by the fastening devices that secure the trap to the screen door. When the trap is detached from the screen door, the slidable closure may be readily withdrawn from the guides or ways for emptying the insects after the latter have been killed by hot water, or other suitable means.

The receptacle or trap 1 is preferably rounded at the upper front portion, as shown, and it is supported at the end walls by marginal frames 12 of wire, or other suitable material, and its bottom is composed of upwardly extending oppositely inclined sides or members 13, spaced apart at their upper edges to provide an entrance to the trap and forming a bait-receiving space between them. The wire end frames 12 extend around the ends of the trap and have inclined terminal portions 14, conforming to the configuration of and supporting the inclined side portions or member of the bottom, as clearly illustrated in Figs. 1 and 2 of the drawing. The side frames are also provided with horizontal connecting portions 15, arranged at the bottom of the bait-receiving space 16 and forming supports for a bait-holding trough or receptacle 17. The bait-holding trough or receptacle 17 consists of a horizontal bottom, a vertical end wall, and inclined side walls 18, converging upwardly and adapted to confine a strip 19 of felt or other suitable material upon which the bait for attracting the insects is smeared. The bait strip 19 is folded, as shown in Fig. 2, and it extends under the inclined side walls of the trough, and it is retained in place by the same and is prevented from being dislodged by the opening and closing of the screen door. The flies alighting on the screen crawl upward until they reach the trap or the vicinity thereof, and they are then attracted by the bait and after feeding thereon continue their upward travel until they pass through the entrance opening 20. As the flies do not crawl downwardly, they will be unable to escape through the entrance and are confined in the trap and may be readily killed. The device is applied to the exterior of the screen door and is adapted to catch the flies and prevent them from entering a house when the screen door is open.

The effectiveness of the screen is increased by arranging the bottom at an inclination and dropping the outer portion of the trap or receptacle below the level of the inner portion so as to form an over-hanging hood, as clearly shown at 1ª in Fig. 2 of the drawing. The screen door is provided at its upper portion with a slot or outlet 21, located beneath the trap and adapted to permit flies from the interior to pass outward and enter the trap. The bait-holding trough is soldered, or otherwise secured to the horizontal supporting portions 15 of the end frames, and the bait-receiving space between the inclined side portions of the bottom is open at the end walls 22, which are provided at their lower portions with triangular openings 23 of greater size than the bait trough and strip, but terminating short of the entrance opening 20 and having projecting edges 24 at the openings 23. The projecting edges form extensions or marginal flanges at the ends of the bait-receiving opening to prevent the flies crawling upward on the inclined side portions of the bottom from passing directly out of the openings at the ends of the bait-receiving space. The projecting flange 24 will turn the flies back and will cause them to continue their upward crawling. One end 25 of the bait-holding trough is open to enable the bait strip to be readily placed in and removed from the trough. Both ends of course may be open, if desired. While the fly trap is designed primarily for and is shown applied to screen doors, yet it may be employed on screens for windows or other closures.

Having thus fully described my invention, what I claim as new and desire to secure by Letters Patent, is:—

1. A device of the class described comprising a trap provided at the bottom with an entrance and having a rear wall provided with an opening communicating with the interior of the trap, said rear wall being also provided with terminal attaching portions extending beyond the trap, a closure covering the said opening and having terminal attaching portions extending beyond the trap and arranged in rear of the terminal attaching portions of the rear wall, and fastening devices spaced from the trap and passing through the extended portions of the rear wall and the closure for securing the trap to a suitable support and for retaining the closure in place.

2. A device of the class described including a trap provided at the bottom with an entrance and having a rear wall provided with extended terminal attaching portions, said rear wall being also provided with opposite grooves or ways and having a slot or opening communicating with the interior of the trap, and a slidable closure mounted in the grooves or ways and having its terminals arranged at the terminal attaching portions of the rear wall so as to be retained in place by the fastening means for securing the trap to a screen door or other support.

3. A device of the class described comprising a trap having a bottom composed of opposite inclined side portions extending upwardly into the trap and spaced apart to provide an entrance to the same and to form a lower bait receiving space and adapted to direct flies upwardly into the trap, the end walls of the trap being provided at the bait receiving space with openings and having marginal flanges located at opposite sides of the openings and projecting from the inner faces of the inclined side portions of the bottom to direct flies or other insects inward.

4. A device of the class described including a trap or receptacle having a bottom composed of side portions spaced apart to provide an entrance to the trap or receptacle and to form a lower bait-receiving space, a trough having inclined sides and open at one end, and a bait strip supported by the trough and engaged by the sides thereof and adapted to be introduced into the same and removed therefrom through the open end of the said trough.

In testimony, that I claim the foregoing as my own, I have hereto affixed my signature in the presence of two witnesses.

WILLARD D. BAKER.

Witnesses:
W. F. MAY,
JOHN McGUIRE.